(No Model.)
C. WILLMS.
BATTERY CELL.
No. 572,285.  Patented Dec. 1, 1896.
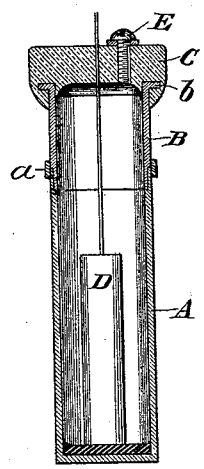
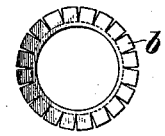
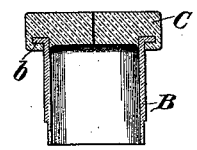
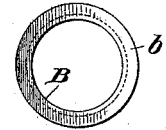
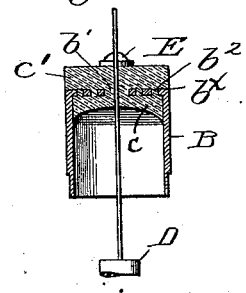
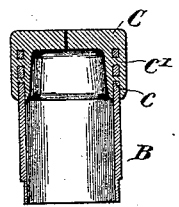
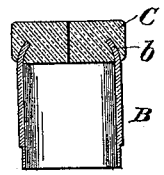
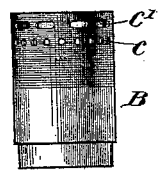
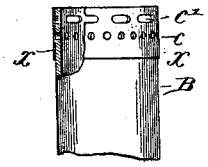
Witnesses
J. N. Withrow
Guy E. Davis
Inventor
Charles Willms,
By his Attorneys,
Baldwin Davidson & Wight

UNITED STATES PATENT OFFICE.

CHARLES WILLMS, OF BALTIMORE, MARYLAND.

BATTERY-CELL.

SPECIFICATION forming part of Letters Patent No. 572,285, dated December 1, 1896.

Application filed August 15, 1896. Serial No. 602,896. (No model.)

*To all whom it may concern:*

Be it known that I, CHARLES WILLMS, a citizen of the United States, and a resident of Baltimore city, in the State of Maryland, have invented certain new and useful Improvements in Galvanic-Battery Cells, of which the following is a specification.

My present invention consists in certain improvements on hermetically-sealed battery-cells by means of which a perfect seal is obtained in a much simpler manner than heretofore.

I have heretofore invented and patented numerous ways of sealing the cells of batteries which, while efficient, are more or less complicated and expensive.

In carrying out my present invention I use a cap, stopper, or seal of caoutchouc and vulcanize it to the cell. By this means a perfect seal is obtained, which is also suitable to support one or more of the electrodes, as well as a vent-screw. As will hereinafter be more particularly explained, the stopper or seal may be applied at the open end of a cell or vessel formed in one piece, or it may be applied to one section of a compound vessel, or a ring or ferrule fitted to the edge of the vessel, or forming one end thereof.

My invention may be applied in many different ways, some of which will be hereinafter described.

In the accompanying drawings, Figure 1 shows a vertical longitudinal section of one of my improved battery-cells. Fig. 2 is a plan view of the flanged ring or ferrule detached. Fig. 3 shows a vertical central section through a modified form of the ferrule and the seal or stopper applied thereto. Fig. 4 is a top plan view of the ferrule shown in Fig. 3. Fig. 5 shows a vertical longitudinal section of a modification of the ferrule and its seal, and Fig. 6 is a side elevation of the same with the seal removed. Figs. 7 and 8 show vertical central sections of other modifications. Figs. 9 and 10 show a vertical longitudinal section and a perspective view of another way of applying my improvements. Fig. 11 is a detail view showing the manner of applying a copper coating to the end of the cell for the purpose of receiving the vulcanite cap.

In Fig. 1 I have shown the cell or vessel as formed in two sections A and B, the section A being the cell proper, while the section B is in the form of a ferrule. I prefer to form both sections of the cell of zinc, in which case the section A may constitute one of the elements of the cell. The ferrule B, while of zinc, is not in contact with the battery fluid and will therefore not be acted on thereby unless the cell is carelessly handled. The ferrule is preferably connected with the lower section A of the cell by a sliding or interlocking connection and by a strip of metal $a$, which is soldered around the joint. When the section A is formed of zinc, it will in time become used up. It may then be removed and replaced by a new zinc section, the ferrule B being suitable for use in a number of cells in succession. The joint between the sections A and B is such that while it is sufficient to hold the sections together when in use against all ordinary strains or pressure it may be readily opened when desired by melting the solder. The top of the section or ferrule B is shown in Figs. 1, 2, 3, and 4 as formed with an annular flange $b$, Fig. 2 showing the flange as serrated, while in Fig. 4 the flange is plain.

In Figs. 5 and 6 the ferrule is shown as unflanged but provided with apertures $c\ c'$. Fig. 7 shows the ferrule flanged, or, rather, with its top edge curved inward, and Fig. 8 shows it flaring outward at the top. In each instance the ferrule is so formed as to afford means for interlocking with the cap, seal, or stopper C, which is applied to it. In order also to insure a better connection between the cell and the seal or stopper C, which is made of caoutchouc, I apply to the cell a cap or covering of some material, such as copper, to which the caoutchouc will more firmly adhere. I find that the sulfur present in the caoutchouc has an affinity for copper, and that where that portion of the casing or ferrule which is in contact with the caoutchouc is thus treated a very much better seal is produced. It is desirable to apply the copper only to such part as is to be covered by the caoutchouc. If any copper remains exposed, it should be removed to avoid local action in the cell.

In Fig. 11 I have indicated how the copper is applied. $x$ indicates the copper coating, but the thickness is very much exaggerated in order that it may be more clearly seen.

The cap or stopper C is formed of caoutchouc while in a soft state at the open end of the cell and is then vulcanized. It is obvious that this caoutchouc seal may be applied in various ways, either by embedding the edge of the cell or the ferrule in the seal, as shown in Figs. 1, 3, 5, and 7, or by extending it over the flaring edge of the ferrule, the precise way being immaterial so long as a firm connection is made that will prevent the seal from being detached when in use or by gases generated in the cell. One element of the cell D is shown in the form of a cylindrical rod suspended by its conducting-wire, which passes through the vulcanite seal.

The battery elements and the electrolyte may be of any desired suitable material. For instance, the element D may be made of chlorid of silver, the casing A of zinc, and the electrolyte may be sulfate of zinc, but I wish it distinctly understood that any suitable battery elements and electrolyte may be used. A screw-plug E also passes through an opening in the seal and has one of its sides cut away, as indicated. When retracted, this screw will act as a vent to permit the escape of gas.

In Figs. 9 and 10 the upper part or section of the cell is provided with a metallic end piece $b^\times$, which is slotted or fenestrated at $b'$ and perforated at $b^2$. A piece of caoutchouc $c$ is placed inside the cell-section and a piece $c'$ is placed outside thereof. While soft the pieces $c\ c'$ are pressed toward each other, thereby filling the openings $b'\ b^2$ and uniting with each other. A very secure seal is thus produced, which cannot possibly be blown out by gas or destroyed by ordinary use. One or more elements of the cell may be suspended from the caoutchouc, passing through the opening $b'$. The screw E may also be similarly located.

I have heretofore employed various devices for sealing voltaic cells, but by my present improvements for the first time have produced a seal which fulfils satisfactorily all requirements. When vulcanized, the caoutchouc is extremely hard and durable, it is not affected by battery fluids, it can be readily drilled, and it firmly adheres to and interlocks with the end of the cell when the latter is suitably prepared.

I claim as my invention—

1. A battery cell or vessel having a seal or stopper of caoutchouc vulcanized to it.

2. A battery cell or vessel having a seal or stopper of caoutchouc vulcanized to and interlocked with it.

3. A battery cell or vessel prepared at its end with a coating of copper to insure its adhesion to the sealing material, and having a seal or stopper of caoutchouc vulcanized to its prepared end.

4. A battery cell or vessel having a flanged end and a seal or stopper of caoutchouc vulcanized to its flanged end.

5. A battery cell or vessel having a perforated end and a seal or stopper of caoutchouc on opposite sides of the perforated end and extending through the perforations thereof.

6. A battery cell or vessel provided with a detachable ferrule at one end, to which is firmly secured a seal or stopper of vulcanite.

7. A battery cell or vessel made in two sections detachably connected, and provided with a seal or stopper of caoutchouc vulcanized to its end.

8. A battery cell or vessel having a seal or stopper of caoutchouc vulcanized to it, in combination with an element suspended from the stopper, and a vent-screw extending through it.

In testimony whereof I have hereunto subscribed my name.

CHARLES WILLMS.

Witnesses:
SAMUEL S. BOGGS,
WILLIAM J. LAKE.